United States Patent [19]

Rieck et al.

[11] Patent Number: 4,950,310
[45] Date of Patent: Aug. 21, 1990

[54] PROCESS FOR THE PREPARATION OF CRYSTALLINE SHEET SODIUM SILICATES

[75] Inventors: Hans-Peter Rieck, Hofheim am Taunus; Martin Schott, Steinbach; Willy Ott, Kelkheim; Werner Gohla, Niederkassel, all of Fed. Rep. of Germany

[73] Assignee: Hoechst Aktiengesellschaft, Frankfurt am Main, Fed. Rep. of Germany

[21] Appl. No.: 281,805

[22] Filed: Dec. 8, 1988

[30] Foreign Application Priority Data

Dec. 11, 1987 [DE] Fed. Rep. of Germany ....... 3742043

[51] Int. Cl.$^5$ .............................................. C01B 33/02
[52] U.S. Cl. .................... 34/295 R; 23/303; 423/332; 423/333
[58] Field of Search ................. 252/135, 140, 174.25; 423/332, 333; 23/295 R, 303

[56] References Cited

U.S. PATENT DOCUMENTS

| | | | |
|---|---|---|---|
| 4,166,039 | 8/1979 | Wise | 252/174.25 |
| 4,478,735 | 10/1984 | Yazaki et al. | 252/135 |
| 4,524,010 | 6/1985 | Reuter et al. | 252/135 |
| 4,585,642 | 4/1986 | Rieck | 423/333 |
| 4,632,815 | 12/1986 | Valyocsik | 423/333 |
| 4,664,839 | 5/1987 | Rieck | 252/135 |
| 4,737,306 | 4/1988 | Wichelhaus et al. | 252/140 |

FOREIGN PATENT DOCUMENTS

| | | | |
|---|---|---|---|
| 0164552 | 11/1985 | European Pat. Off. | 423/333 |
| 3413571 | 4/1984 | Fed. Rep. of Germany | 252/135 |
| 3417649 | 11/1985 | Fed. Rep. of Germany | 423/333 |

OTHER PUBLICATIONS

A. Willgallis et al., Glastechn. Ber. 37, 194-200 (1964).
*Gmelins Handbuch der Anorganischen Chemie*, 8th Ed., Part C ("Phosphorus"), System No. 16, Vergal Chemie, Weinheim, 1965, p. 259.
K. Beneke et al., Am. Minerol., 62, 763-771 (1977).

*Primary Examiner*—Christine M. Nucker
*Assistant Examiner*—Eric Steffe

[57] ABSTRACT

X-ray crystalline sodium silicates having a sheet structure and an $SiO_2:Na_2O$ molar ratio of 1.9 to 3.5 are prepared by dissolving an X-ray crystalline sodium silicate having a sheet structure and an $SiO_2/Na_2O$ molar ratio of 1.9:1 to 3.5:1 in water and evaporating the solution at temperatures of 20° to 445° C.

For the preparation of detergents or cleaners, a mixture of surfactants and builders, which may also contain fillers, bleaching agents, bleach activators and enzymes, is made into a paste with water, mixed with an X-ray crystalline sheet sodium silicate having an $SiO_2/Na_2O$ molar ratio of 1.9:1 to 3.5:1, mixed thoroughly and then spray-dried.

3 Claims, No Drawings

PROCESS FOR THE PREPARATION OF CRYSTALLINE SHEET SODIUM SILICATES

The present invention relates to a process for the preparation of sheet sodium silicates which, according to the X-ray diffraction spectrum, are crystalline and have an $SiO_2/Na_2O$ molar ratio of 1.9:1 to 3.5:1, by removing water from a sodium silicate solution at elevated temperature.

The various crystalline sodium silicates disclosed can be distinguished from one another by their composition (sometimes stated merely as the $SiO_2/Na_2O$ ratio) and by their specific X-ray diffraction pattern. Frequently, it is possible to prepare a sodium silicate of unchanged composition with different crystal structures. In general the individual forms differ from one another in their physical and chemical properties—even if only slightly in some cases. The fact that they are crystalline forms is evident from the X-ray diffraction spectrum.

One of the typical properties of the crystalline sheet sodium silicates is that they can be converted into free sheet silicas using equivalent amounts of hydrochloric acid. The amount of acid necessary for this purpose defines the ion exchange capacity of the sodium silicate. This capacity can be determined by titration. The free acids obtained simultaneously are sparingly soluble in water.

The preparation of crystalline sodium salts of silicas having an $SiO_2/Na_2O$ ratio of 2:1 to 3:1 is usually carried out by heating sodium silicate glasses or by heating sodium carbonate and quartz (German Willgallis and Range (Glastechn. Ber., 37 (1964), 194–200) describe the preparation of $\alpha$-, $\beta$- and $\gamma$-$Na_2Si_2O_5$ by heating molten and non-molten waterglass which has been dewatered. These products have a sheet structure. The fact that they are crystalline forms is evident from the X-ray diffraction spectra. The authors show that various crystalline forms are obtained, depending on the temperature. It is not possible to prepare $\delta$-$Na_2Si_2O_5$ by this process.

Benecke and Lagaly describe in Am. Mineral., 62 (1977), 763–771, a process for the preparation of a hydrated crystalline sodium silicate having the Kanemite structure (having the approximate composition $NaHSi_2O_5$). In a first step of this procedure, $SiO_2$ is dispersed in methanol and cold sodium hydroxide solution is added. This process is expensive owing to the controlled addition of the individual substances and requires special safety precautions due to the use of combustible methanol.

German Offenlegungsschrift No. 3,417,649 describes a process in which crystal seeds are added to hydrated sodium silicate, water is removed from the reaction mixture by heating and the dehydrated reaction mixture is kept at a temperature which is at least 450° C. but below the melting point until the crystalline sodium silicate having a sheet structure has separated out.

In the removal of water (during evaporation) from waterglass solutions or solutions of conventional sodium silicates (without sheet structure) having an $SiO_2/Na_2O$ molar ratio of 1.9:1 to 3.5:1, amorphous products are obtained. It is only at temperatures above 450° C. and in the course of several hours that these products crystallize in the presence of an aqueous phase (German Offenlegungsschrift No. 3,417,649). This reaction generally requires several hours. At temperatures between 600° and 850° C., minutes and, in the case of certain silicates, fractions of a minute are also sufficient in some cases.

It was the object to free the initially obtained crystalline sheet sodium silicates from impurities, in particular sparingly soluble impurities. The invention is based on the observation that a few crystalline sheet sodium silicates, in particular those of the composition $Na_2Si_2O_5$, dissolve in water, and the aqueous solutions form crystalline sheet sodium silicates again on removal of water. This is surprising because it is known that alkali metal silicates in solution relatively rapidly form a polymerization equilibrium dependent on concentration, temperature and pH (Gmelin, Vol. 16, Section C, page 259—Phosphorus). This means that the sheet-like polyanions originally present in the crystal lattice would be destroyed.

A process for the preparation of X-ray crystalline sodium silicates which have a sheet structure and an $SiO_2/Na_2O$ molar ratio of 1.9:1 to 3.5:1 has been found, wherein an X-ray crystalline sodium silicate having a sheet structure and an $SiO_2/Na_2O$ molar ratio of 1.9:1 to 3.5:1 is dissolved in water and the solution is evaporated at temperatures of 20° to 445° C.

Preferably, the solution of the sheet silicate is filtered before evaporation in order to free it from impurities.

Evaporation is preferably effected at temperatures of 70° to 300° C., in particular 100° to 200° C.

The sodium silicates having a sheet structure which are to be dissolved in water can be obtained in a conventional manner from aqueous solutions of amorphous alkali metal silicates. For the process according to the invention, it is advantageous to prepare a concentrated solution of the sheet sodium silicate, since hydrolysis occurs in dilute solution and with the prolonged action of water, in particular at elevated temperature, with the result that the sheet silicate is degraded to low molecular weight fragments which can no longer be converted into crystalline sheet silicates.

In particular, it is also possible to prepare silicates having the composition $Na_2Si_2O_5$ by the process according to the invention. In this respect, for example, the compound Na-SKS-7, whose X-ray diffraction spectrum is described in German Offenlegungsschrift No. 3,417,649, Table 3, and whose preparation is described in Glastechn. Ber., Vol. 37 (1967) 194–200, may be mentioned. It has been found that Na-SKS-7 can also be obtained by recrystallization of the compound Na-SKS-6. The X-ray diffraction spectrum of Na-SKS-6 is shown in Table 2 of German Offenlegungsschrift No. 3,417,649. Its preparation is described in Zeitschrift f. Kristallographie, Vol. 129 (1969), pages 396–404. It has the approximate composition $Na_2Si_2O_5$.

In most cases, the silicates prepared according to the invention have the same $Na_2O/SiO_2$ ratio as the particular starting material. However, they need not have the same X-ray diffraction pattern.

The crystalline sheet sodium silicates prepared according to the invention can be identified from their X-ray diffraction pattern. Typical X-ray diffraction patterns are shown in Tables 1 to 7.

The process, according to the invention, of dissolution and recrystallization of sheet sodium silicates is also of importance for the production of detergents and cleaners (in particular dishwashing agents). German Offenlegungsschrift No. 3,413,571 states that crystalline sheet alkali metal silicates are suitable as builders. The solid silicates can be mixed with the other components of a detergent or cleaner formulation.

Another embodiment of the process according to the invention comprises a process for the preparation of detergents or cleaners in which a mixture of surfactants and builders, which may also contain fillers, bleaching agents, bleach activators and auxiliaries, is made into a paste with water, mixed thoroughly and then spray-dried. In this process, an X-ray crystalline sheet sodium silicate having an $SiO_2/Na_2O$ molar ratio of 1.9:1 to 4.0:1, preferably 1.9:1 to 3.5:1, is incorporated into the water-containing mixture. During thorough mixing and subsequent spray-drying, at least partial recrystallization of the sheet sodium silicate takes place.

In the formulation of the detergents and cleaners, instead of the solid sheet sodium silicate it is also possible to use an aqueous solution thereof and mix it with further components of the detergent or cleaner and then to remove water from the mixture. This removal of water advantageously takes place in a spray tower. For the spray process, gas inlet temperatures of 70° to 300° C., in particular 100° to 200° C., are advantageous.

Crystalline sheet alkali metal silicates which are not dissolved need not necessarily be present in the mixture to be evaporated but act as seeds and promote crystallization.

Bleach activators, surfactants, builders, bleaching agents and auxiliaries are conventional components of detergents. These components can be varied within wide limits.

The surfactants include the anionic surfactants, such as soap, alkylbenzenesulfonates, alkanesulfonates, α-olefinsulfonates, hydroxyalkanesulfonates, methyl esters of α-sulfato-fatty acids, alkylsulfates and alkyl ether sulfates, as well as nonionic surfactants, such as primary or secondary alcohol oxyethylates, alkylphenol oxyethylates, fatty acid ethanolamides and amine oxides, as well as cationic surfactants, such as tetraalkylammonium chlorides, and amphoteric surfactants, such as sulfobetaines and betaines.

The bleaching agents include, in particular, those based on peroxide and hypochlorite, such as sodium perborate or sodium hypochlorite solution.

It is also possible to use bleach activators, such as, for example, tetraacetylethylenediamine, bleach catalysts and bleach stabilizers, such as magnesium silicate.

The auxiliaries include enzymes, graying inhibitors, foam regulators, corrosion inhibitors, optical brighteners, fragrances, dyes and standardizing agents and formulation auxiliaries.

The invention is illustrated in more detail by the Examples.

EXAMPLE 1

50 parts of water are added to 50 parts of Na-SKS-6 ($Na_2O:2SiO_2$) which has been prepared according to German Offenlegungsschrift No. 2,317,649 (Example 3), and the mixture is heated to 80° C. so that a cloudy solution is obtained. The mixture is first kept at 80° C. for a further 10 hours and then dehydrated at 120° C. The X-ray diffraction pattern is shown in Table 8. It corresponds to that of Na-SKS-7 (Table).

EXAMPLE 2

55 parts of water are added to 45 parts of Na-SKS-6 ($Na_2O:2SiO_2$) which has been prepared according to German Offenlegungsschrift No. 3,417,649, and the mixture is heated at 60° C. for 45 minutes. The mixture is then sprayed in a spray dryer ("Büchi" 190) under a pressure of 5 bar. The inlet temperature of the air is 170° C. and the outlet temperature is 80° C. The X-ray diffraction pattern is shown in Table 9. It corresponds to that of Na-SKS-7.

EXAMPLE 3

50 parts of X-ray amorphous spray-dried sodium silicate having the composition $Na_2O:SiO_2$ (containing about 18% of water) is recrystallized analogously to Example 1. The product obtained is X-ray amorphous.

In the following Tables, V=Very; W=Weak; M=Moderate; and St=Strong

TABLE 1

| Na-SKS-5 | |
|---|---|
| $d(10^{-8}$ cm) | Relative Intensity |
| 4,92 (±0,10) | m–st |
| 3,95 (±0,08) | w |
| 3,85 (±0,08) | m–st |
| 3,77 (±0,08) | st–v st |
| 3,29 (±0,07) | v st |
| 3,20 (±0,06) | w |
| 2,64 (±0,05) | w–m |
| 2,53 (±0,05) | w |
| 2,45 (±0,05) | m–st |
| 2,41 (±0,05) | w |
| 2,38 (±0,05) | w |

TABLE 2

| Na-SKS-6 | |
|---|---|
| $d(10^{-8}$ cm) | Relative Intensity |
| 4,92 (±0,10) | w |
| 3,97 (±0,08) | v st |
| 3,79 (±0,08) | m–st |
| 3,31 (±0,07) | w |
| 3,02 (±0,06) | w–m |
| 2,85 (±0,06) | w |
| 2,65 (±0,05) | w |
| 2,49 (±0,05) | w |
| 2,43 (±0,05) | m |

TABLE 3

| Na-SKS-7 | |
|---|---|
| $d(10^{-8}$ cm) | Relative Intensity |
| 7,96 (±0,16) | w |
| 6,00 (±0,12) | v st |
| 5,48 (±0,11) | w |
| 4,92 (±0,11) | w |
| 4,30 (±0,09) | m |
| 4,15 (±0,08) | st |
| 3,96 (±0,08) | st–v st |
| 3,78 (±0,08) | m–st |
| 3,63 (±0,07) | v st |
| 3,31 (±0,07) | w |
| 3,12 (±0,06) | w–m |
| 3,08 (±0,06) | w–m |
| 3,06 (±0,06) | m–st |
| 2,97 (±0,06) | st–v st |
| 2,85 (±0,06) | w |
| 2,70 (±0,05) | w–m |
| 2,66 (±0,05) | m–st |
| 2,63 (±0,05) | w |
| 2,59 (±0,06) | w–m |
| 2,54 (±0,05) | w–m |
| 2,43 (±0,05) | v st |

TABLE 4

| Na-SKS-11 | |
|---|---|
| $d(10^{-8}$ cm) | Relative Intensity |
| 6,08 (±0,12) | w |
| 5,88 (±0,12) | w–m |
| 4,22 (±0,08) | v st |
| 3,26 (±0,07) | w–m |

TABLE 4-continued

Na-SKS-11

| d($10^{-8}$ cm) | | Relative Intensity |
|---|---|---|
| 3,03 | (±0,06) | w–m |
| 2,94 | (±0,06) | m |
| 2,89 | (±0,06) | w |
| 2,64 | (±0,05) | w–m |
| 2,56 | (±0,05) | 2–m |
| 2,49 | (±0,05) | w |
| 2,43 | (±0,05) | w |

TABLE 5

Na-SKS-9

| d($10^{-8}$ cm) | | Relative Intensity |
|---|---|---|
| 7,79 | (±0,16) | m–v st |
| 4,68 | (±0,09) | m–v st |
| 4,06 | (±0,08) | w–m |
| 3,94 | (±0,08) | w–m |
| 3,86 | (±0,08) | w–m |
| 3,62 | (±0,07) | v st |
| 3,55 | (±0,07) | st–v st |
| 3,53 | (±0,07) | st–v st |
| 3,26 | (±0,07) | w–m |
| 3,18 | (±0,06) | w–m |
| 2,72 | (±0,05) | w–m |
| 2,46 | (±0,05) | w–m |

TABLE 6

Na-SKS-10

| d($10^{-8}$ cm) | | Relative Intensity |
|---|---|---|
| 10,3 | (±0,21) | m–v st |
| 5,17 | (±0,10) | w–m |
| 4,02 | (±0,08) | v st |
| 3,65 | (±0,07) | m–st |
| 3,45 | (±0,07) | m–v st |
| 3,17 | (±0,06) | m–v st |
| 3,11 | (±0,06) | w–st |
| 2,48 | (±0,05) | m–v st |
| 2,33 | (±0,05) | w–m |
| 2,01 | (±0,04) | w–m |

TABLE 7

Na-SKS-13

| d($10^{-8}$ cm) | | Relative Intensity |
|---|---|---|
| 6,37 | (±0,13) | m–st |
| 4,04 | (±0,08) | m–st |
| 3,87 | (±0,08) | v st |
| 3,58 | (±0,07) | m–st |
| 3,20 | (±0,06) | w–m |
| 3,04 | (±0,06) | w–m |
| 2,67 | (±0,05) | w–m |
| 2,45 | (±0,05) | w–m) |
| 2,31 | (±0,05) | w–m |

TABLE 8

(Example 1)

| d($10^{-8}$ cm) | | Relative Intensity |
|---|---|---|
| 7,94 | (±0,16) | w |
| 6,0 | (±0,12) | st |
| 5,47 | (±0,11) | w |
| 4,92 | (±0,10) | w |
| 4,29 | (±0,09) | m |
| 4,14 | (±0,08) | m–st |
| 3,96 | (±0,08) | v st |
| 3,78 | (±0,08) | m |
| 3,63 | (±0,07) | st–v st |
| 3,31 | (±0,07) | w |
| 3,11 | (±0,06) | w |
| 3,06 | (±0,06) | w |
| 2,97 | (±0,06) | v st |
| 2,84 | (±0,06) | w |
| 2,77 | (±0,05) | w |
| 2,69 | (±0,05) | w–m |
| 2,66 | (±0,05) | w–m |
| 2,59 | (±0,05) | w |
| 2,54 | (±0,05) | w–m |
| 2,49 | (±0,05) | w |
| 2,43 | (±0,05) | v st |
| 2,37 | (±0,05) | w |

TABLE 9

(Example 2)

| d($10^{-8}$ cm) | | Relative Intensity |
|---|---|---|
| 7,86 | (±0,16) | w |
| 5,97 | (±0,12) | m–st |
| 5,44 | (±0,11) | w |
| 4,89 | (±0,10) | w |
| 4,27 | (±0,09) | m |
| 4,12 | (±0,08) | m–st |
| 3,94 | (±0,08) | v st |
| 3,77 | (±0,08) | m |
| 3,62 | (±0,07) | st |
| 3,43 | (±0,07) | w |
| 3,30 | (±0,07) | w |
| 3,05 | (±0,06) | m |
| 2,96 | (±0,06) | st–v st |
| 2,83 | (±0,06) | w |
| 2,68 | (±0,05) | w–m |
| 2,65 | (±0,05) | w–m |
| 2,58 | (±0,05) | w |
| 2,54 | (±0,05) | w–m |
| 2,48 | (±0,05) | w |
| 2,42 | (±0,05) | st–v st |
| 2,36 | (±0,05) | w |

We claim:

1. A process for the preparation of x-ray crystalline sodium silicates of the formula $\beta$-$Na_2Si_2O_5$, which has a sheet structure and whose x-ray diffraction spectrum is in accordance with Table 3, wherein an x-ray crystalline sodium silicate of the formula $\delta$-$Na_2Si_2O_5$, having a sheet structure and whose x-ray diffraction spectrum is in accordance with Table 2 is dissolved in water at a concentrated solution sufficient to avoid hydrolysis and evaporated at temperatures of 20° to 445° C.

2. A process as claimed in claim 5, wherein evaporation is carried out at temperatures of 70° to 300° C.

3. A process as claimed in claim 5, wherein evaporation is carried out at temperatures of 100° to 200° C.

* * * * *